April 10, 1951     C. SOBEL ET AL     2,548,404
WAVE GUIDE CLIP
Filed Sept. 29, 1948     2 Sheets-Sheet 2
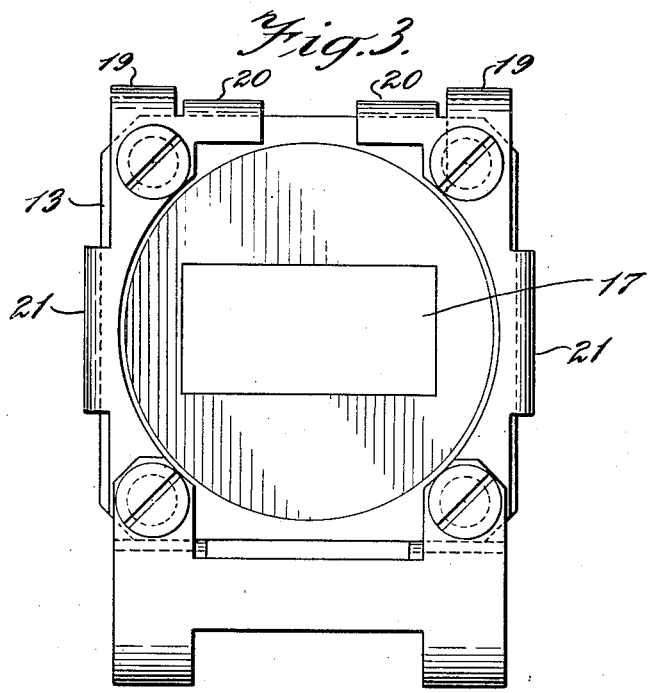
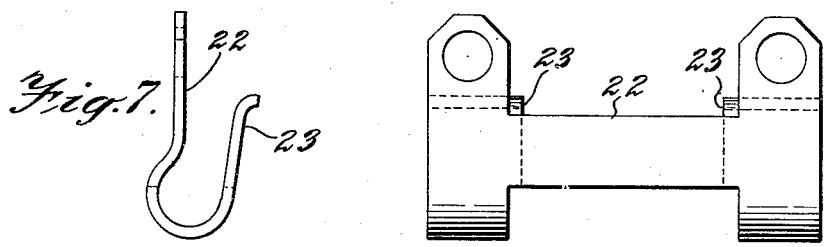
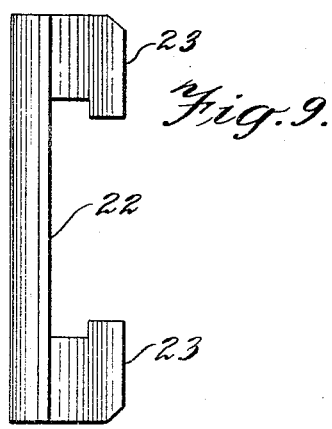
INVENTORS
Charles Sobel
and Rudolph C. De Giovine
BY Burgess, Ryan + Hicks
ATTORNEYS Patented Apr. 10, 1951

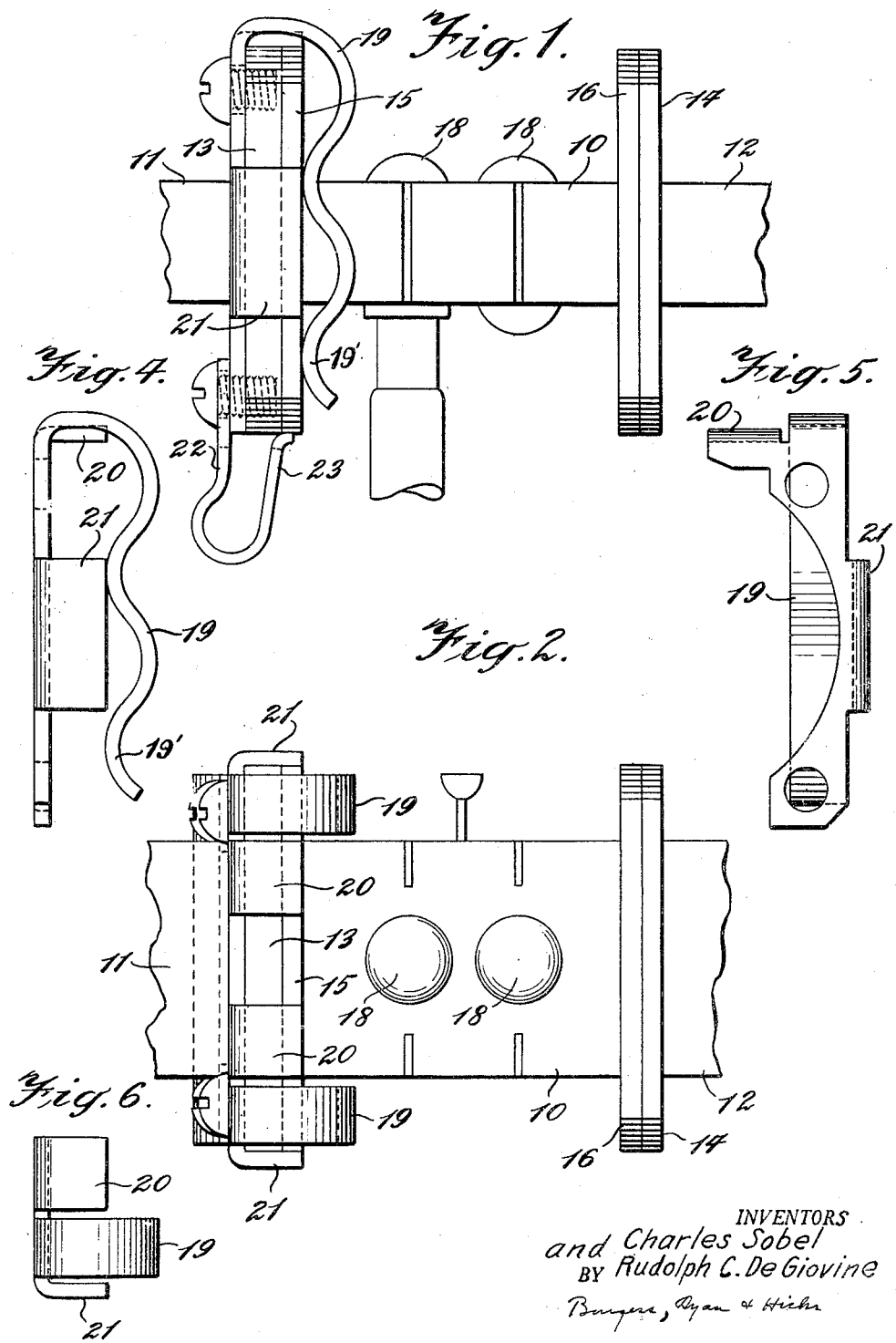

2,548,404

UNITED STATES PATENT OFFICE 2,548,404

WAVE GUIDE CLIP

Charles Sobel, New York, and Rudolph C. De Giovine, Jackson Heights, N. Y., assignors to Reeves Instrument Corporation, New York, N. Y., a corporation of New York Application September 29, 1948, Serial No. 51,832

7 Claims. (Cl. 285—143)

The present invention relates to a wave guide and relates more particularly to a wave guide device for detachably securing a removable section of the wave guide in alignment with fixed sections thereof.

The present invention provides a wave guide of the type used in radar or other electronic applications where a section of the wave guide may be removed and replaced without the use of tools. Such an arrangement permits the removable section to be changed or repairs to be made in the shortest possible time as such equipment is often under conditions where it is of great importance that such changes or repairs be made with the utmost speed. The various objects and advantages of the invention will be apparent and best understood from the following description and the accompanying drawings in which:

Fig. 1 is a side view of a portion of a wave guide embodying the invention;

Fig. 2 is a plan view of the wave guide illustrated in Fig. 1;

Fig. 3 is an end view of the wave guide illustrated in Fig. 1;

Fig. 4 is a side view of a spring clip for holding a removable section of the wave guide in place;

Fig. 5 is a rear view of the spring clip illustrated in Fig. 4;

Fig. 6 is a top view of the spring clip illustrated in Fig. 4;

Fig. 7 is a side view of a latch for securing the removable section of the wave guide in place;

Fig. 8 is a rear view of the support illustrated in Fig. 7; and

Fig. 9 is a plan view of the support illustrated in Fig. 7.

Referring now to the drawings in detail, there is a removable section 10 of a wave guide that is positioned between two fixed sections 11 and 12 of the wave guide. The fixed sections 11 and 12 are provided with flanges 13 and 14 against which matching flanges 15 and 16 on the ends of the removable section 10 abut. The fixed sections 11 and 12 and the removable section 10 of the wave guide are hollow forming a rectangularly shaped passageway 17 through which ultra high frequency waves travel. When the removable section 10 is appropriately positioned between the fixed sections 11 and 12, the sections are aligned with the passageways 17 of these sections forming a continuous and uninterrupted passageway through the wave guide.

Electronic devices such as vacuum tubes, as indicated at 18 may be incorporated in the removable section 10 of the wave guide. Such devices have portions thereof that are located in the passageway 17 where they will be subject to the effects of the electrical impulses or waves passing through the passageway 17. Since the electronic devices 18 may require replacement or may have to be changed for other reasons, it is desirable that such replacement or change be made as easily and as quickly as possible and the present invention permits this to be done normally without the use of tools or other instruments.

For this purpose, a pair of spring clips 19 are secured to the flange 13 of the fixed section 11 of the wave guide. When the removable section 10 is inserted between the fixed sections 11 and 12, the spring clips 19 resiliently engage with the back of the flange 15 that is located at an end of the removable section 10 so as to hold the faces of the flanges 11 and 15 against each other. The spring fingers 19' of the spring clips 19 are provided with laterally extending projections 20 and 21 at the tops and sides thereof respectively and these projections 20 and 21 are aligned with and extend beyond the flange 13 on the fixed section 11 at the top and sides thereof. The portions of the projections 20 and 21 that thus extend beyond the flange 13 engage with and position the flange 15 and the removable section 10 of the wave guide so that the passageways 17 in the fixed and removable sections are aligned.

A resilient latch member 22 is also secured to the flange 13 on the fixed section 11 of the wave guide and engages with the bottom edge of the flange 15 on the removable section 10 of the wave guide and supports the flange 15 and the removable section 10 when the flange 15 is inserted beneath the spring clips 19. The latch member 22, as illustrated, consists of a pair of U-shaped spring fingers 23 with their ends located beneath the flange 15 of the removable section 10 at the ends thereof. The flange 15 may thus be inserted or removed from the spring clips 19 by simply pressing the spring fingers back. However, when the flange 15 of the removable section 10 is inserted beneath the spring clips 19 and its edges have been brought into engagement with the projections 20 and 21 to align the sections of the wave guide properly, the spring fingers 23 are permitted to spring outwardly and serve as a support to hold the removable section 10 in place. This arrangement permits the removable section 10 of the wave guide to be removed easily and quickly without the use of tools or other instruments.

It will be understood that those skilled in the art may make various changes and modifications

We claim:

1. In a wave guide wherein a removable section of the wave guide is supported between fixed sections of the wave guide with passageways extending through said sections in alignment, the combination including a flange carried by one of the fixed sections of the wave guide, a second flange carried by the removable section of the wave guide at one end thereof, the outer face of said second flange being in engagement with the outer face of the first-mentioned flange when the removable section of the wave guide is positioned between the fixed sections, a spring clip carried by one of said flanges to hold the faces of said flanges in engagement, and a resilient latch carried by one of said flanges and engaging with the other of said flanges when said flanges are held in engagement.

2. In a wave guide wherein a removable section of the wave guide is supported between fixed sections of the wave guide with passageways through said fixed and removable sections being in alignment, the combination including a flange carried by one of the fixed sections of the wave guide at the end thereof, a second flange carried by the removable section of the wave guide at the end thereof, the outer faces of said flanges being in abutting relation to each other when the removable section of the wave guide is positioned between the fixed sections, projections carried by one of said flanges, said projections positioning the removable section of the wave guide with a passageway through said removable section in alignment with passageways in said fixed sections, a spring clip carried by one of said flanges and engaging with the other of said flanges to hold the faces of said flanges in engagement, and a resilient latch carried by one of said flanges and engaging with the other of said flange when the faces of the flanges are held in engagement.

3. In a wave guide the combination as defined in claim 2 wherein the projections for positioning the flanges are integral with the spring clip.

4. In a wave guide wherein a removable section of the wave guide is supported between fixed sections of the wave guide with passageways extending through said sections being in alignment, the combination including interengaging members carried by said fixed and removable sections, said interengaging members positioning the removable section with a passageway extending through said section in alignment with passageways in said fixed sections, a spring clip carried by one of the fixed sections, said spring clip engaging with and holding the removable section in engagement with said fixed section, and a resilient latch carried by said fixed section and engaging with the removable section, said latch cooperating with the spring clip to hold the removable section in engagement with the fixed section.

5. In a device for detachably securing a section of the wave guide in place with a passageway in said section aligned with passageways in fixed sections of the wave guide, the combination including a spring clip, said spring clip having a spring finger associated therewith, laterally extending projections located at the top and one side of said spring finger, said projections being aligned with and extending beyond a fixed section of the wave guide, and a resilient latch cooperating with said spring finger, said latch engaging with the detachable section of the wave guide.

6. In a device for detachably securing a section of a wave guide in place with said detachable section connecting fixed sections of the wave guide, the combination including a pair of spring clips carried at the end of one of the sections of the wave guide, each of said spring clips having laterally extending projections located at the tops and sides thereof, said projections engaging with the adjacent end of an adjoining section of the wave guide, and a resilient latch carried at the end of one of the sections of the wave guide and engaging with the adjacent end of the adjoining section of the wave guide, said latch cooperating with the spring clips in maintaining the detachable section of the wave guide in position between the fixed sections.

7. In a device for detachably securing a section of a wave guide in place with said detachable section connecting fixed section of the wave guide, the combination as defined in claim 6 wherein the resilient latch consists of a resilient U-shaped member, said U-shaped member being secured to one of the wave guide sections and having a free end engaging with the adjacent end of the adjoining wave guide section.

CHARLES SOBEL.
RUDOLPH C. DE GIOVINE.

REFERENCES CITED

The following references are of record in the file of this patent:

UNITED STATES PATENTS

| Number | Name | Date |
|---|---|---|
| 1,903,445 | Ernst | Apr. 11, 1933 |
| 2,344,698 | Howe | Mar. 21, 1944 |